E. S. ROBINSON.
SIGNAL LAMP.
APPLICATION FILED MAY 21, 1919.
1,403,567.
Patented Jan. 17, 1922.
2 SHEETS—SHEET 1.
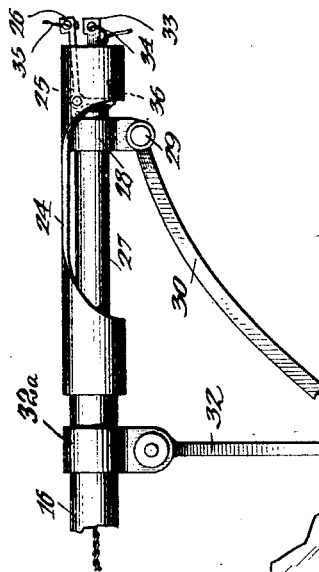
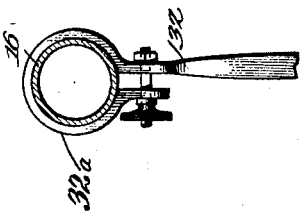
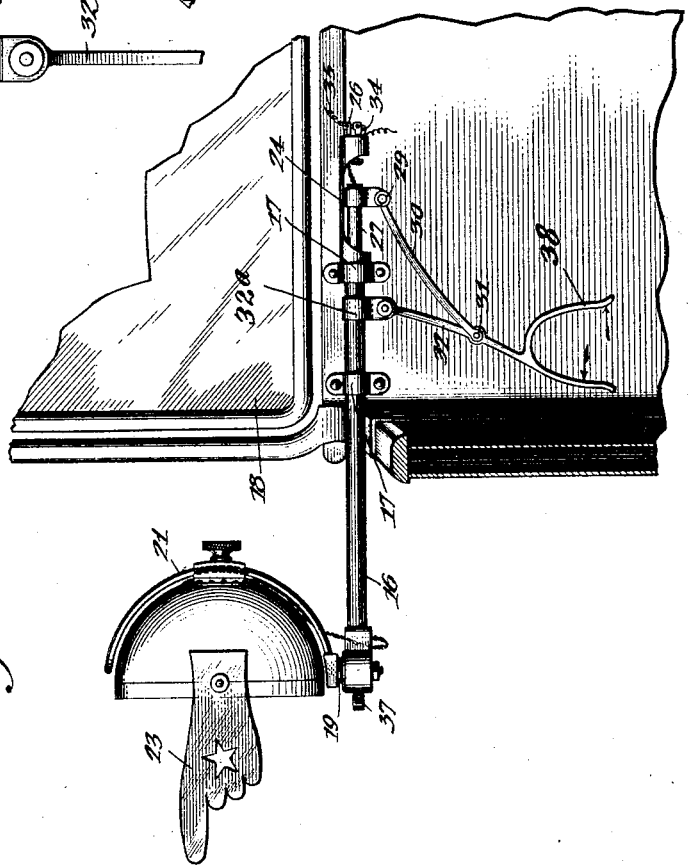
Edward S. Robinson,
INVENTOR.
WITNESSES
BY
ATTORNEYS E. S. ROBINSON.
SIGNAL LAMP.
APPLICATION FILED MAY 21, 1919.
1,403,567.
Patented Jan. 17, 1922.
2 SHEETS—SHEET 2.
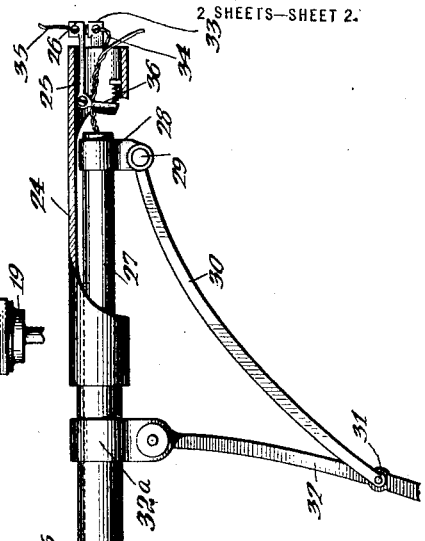
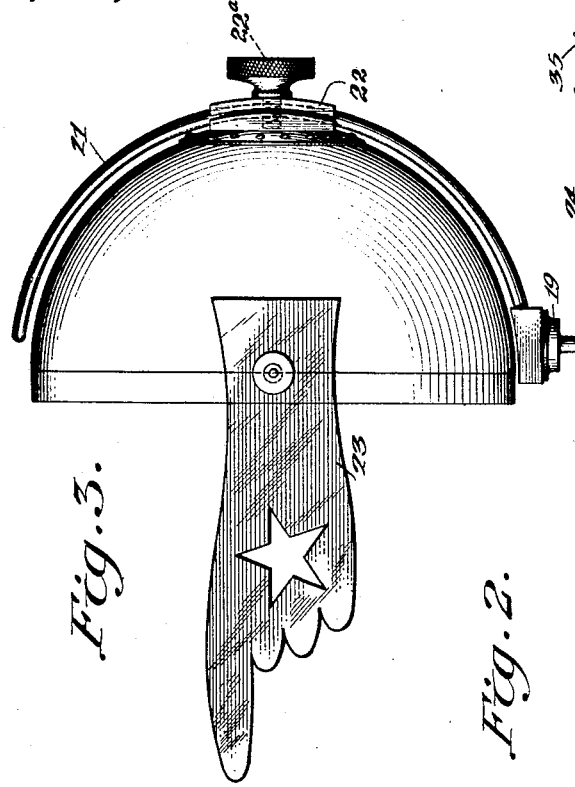
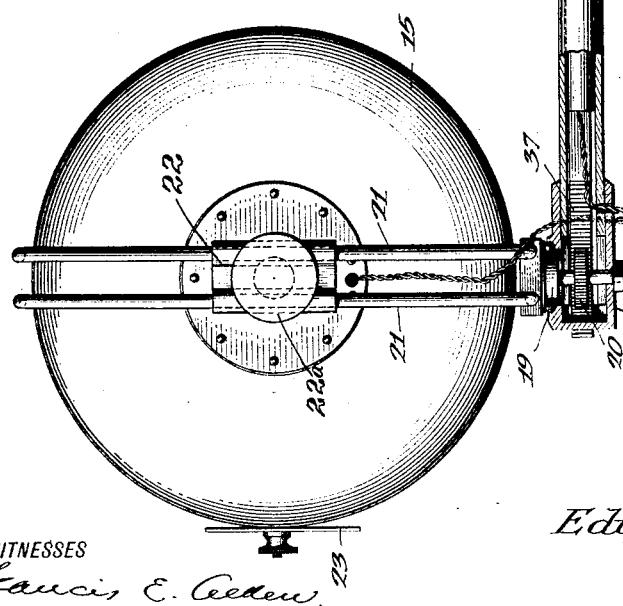
*Edward S. Robinson,*
INVENTOR,
BY
ATTORNEYS
WITNESSES

UNITED STATES PATENT OFFICE.

EDWARD S. ROBINSON, OF OAKLAND, CALIFORNIA.

SIGNAL LAMP.

1,403,567.

Specification of Letters Patent.  Patented Jan. 17, 1922.

Application filed May 21, 1919. Serial No. 298,613.

*To all whom it may concern:*

Be it known that I, EDWARD S. ROBINSON, a citizen of the United States, and a resident of Oakland, in the county of Alameda and State of California, have invented certain new and useful Improvements in Signal-Lamps, of which the following is a specification.

My present invention relates generally to vehicle lamps and more particularly to signal lamps, my primary object being to provide a readily adjustable lamp for automobiles and motor cars in connection with readily and easily operable means for adjusting the same so that a signal may be given other vehicles at turning or stopping points.

With these objects in mind, my invention will be better understood by a comparision of the following description with the accompanying drawings illustrating the preferred embodiment of the invention, and wherein—

Figure 1 is a front elevation illustrating the practical application of my invention, Figure 2 is a similar view, enlarged, of the invention removed, and partly in section, Figure 3 is a side view of the lamp and indicator, Figure 4 is a detail horizontal section through a portion of the device, Figure 5 is a front view of a portion of the device showing the contact broken in its normal position, and Figure 6 is a transverse section illustrating the connection of the controlling arm.

Referring now to these figures, my invention proposes an arrangement whereby a signal lamp 15 is movably mounted at the outer end of a tubular supporting arm 16, this arm being for instance secured by clamps and the like 17 at its inner end to the dash or instrument board of an automobile or other motor car rearwardly of the wind shield 18. The arm 16 is straight and extends laterally from the vehicle as shown, so as to position the lamp 15 at a point which, while avoiding interference with the operation of the machine, will be readily visible to other motor cars and vehicles, particularly those in the rear.

Adjacent to its outer end, the arm 16 has a bracket 16ª supporting a bearing for a rotatable head 19 having a gear 20 in the bore of the arm, and provided with upstanding curved and parallel supporting rods 21 to which the lamp 15 is adjustably clamped by a rear clamp 22 on its casing which clamp opposes and cooperates with a portion of the lamp casing and is controlled and actuated by a knowled screw 22ª threaded into a portion of the lamp casing as particularly seen by a comparison of Figures 2 and 3.

This construction permits of vertical adjustment of the lamp to project its signal beam at the desired angle, as well as rotation of the lamp for signal purposes, to increase the effect of which a signal arm in the shape of the human hand is preferably secured to the lamp casing at one side to projest beyond its front face. This arm is indicated at 23 and is preferably formed of either a transparent or opalescent material and provided with an opening of star shape or other distinctive form through which the light beams may show and thus bring the arm more plainly into view through the contrast.

At its inner end the tubular supporting arm 16 is fixed in a tubular bracket 24, partly cut away, and supporting the fulcrum of a bell-crank 25 preferably formed of non-conducting material having a contact 26 at one end and having its opposite end depending in the path of inward movement of a tubular slide 27 extending through the supporting arm 16 in telescoping relation. At the inner end of this slide a clamp 28 supports the pivot 29 of a lever 30 whose opposite end is pivoted at 31 to a spring controlling arm 32.

The contact 26 opposes a second contact 33 carried by and insulated from the bracket 24 and receiving one of the lamp wires 34, the other of which wires leads to the battery. The contact 26 has a ground lead 35 and one end thereof is engaged by a spring 36 which acts to force contact 26 into engagement with the contact 33 and thus complete the lamp circuit.

The controlling arm 32 is, moreover, fixed at one end by an integral clamp 32a as seen in Figure 6 to the supporting arm 16 and its normal tension serves to maintain the tubular slide 27 in the inner inactive position shown in Figure 5, whereby the inner end thereof abuts one end of the bell-crank 25 and serves to hold the contact 26 in disconnected position against the tension of the weaker spring 36.

At its outer end, the tubular slide 27, through which the lamp wires 34 are preferably extended, has an extending rack 37 projecting exteriorly through a guide opening in the bracket 16ª of the supporting arm 16, and in engagement with the gear 20 so that when the slide 27 is moved outwardly gear 20 will be rotated as will the head 19 and the lamp 15.

Movement is in operation, imparted to the slide 27 from the controlling arm 32 through lever 30 and to facilitate movement of the said arm 32 without requiring the operator to drop his other controls, the arm 32 has at its free end a stirrup 38 for the reception of one knee.

I claim:—

1. The combination with a tubular support, a head rotatable at one end of the support and having a gear, a lamp adjustable on the head, a slide telescoping within the tubular support and having a rack engaging the gear, a resilient actuating and controlling arm clamped to and outstanding from the tubular support, and connected with the slide for actuating the latter and normally maintaining the same in inactive position, and a knee engaging member carried by the outstanding arm, as described.

2. A device of the character described including a supporting tube having an angular bracket at one end, a tubular slide extending through and movable within said supporting tube, having a rack bar in the said bracket, a lamp support rotatably mounted in the bracket and including a stem having a gear in engagement with the rack bar, a lamp mounted in the lamp support, a spring actuating arm rigidly connected at one end to the supporting tube having a knee engaging fork at its opposite end, a connecting rod connecting said spring arm with the inner end of the tubular slide whereby to actuate the latter in its movement and normally retain the same in inner inactive position by virtue of the spring of the arm.

EDWARD S. ROBINSON.